Patent Number: 4,747,484
Date of Patent: May 31, 1988

[54] CONTAINER FOR VIDEO AND SOUND RECORDING MEDIA

[75] Inventor: Peter Ackeret, Kusnacht, Switzerland

[73] Assignee: IDN Invention and Development of Novelties AG, Chur, Switzerland

[21] Appl. No.: 9,390

[22] Filed: Jan. 30, 1987

[30] Foreign Application Priority Data

Jan. 30, 1986 [DE] Fed. Rep. of Germany ....... 3602695

[51] Int. Cl.$^4$ .......................................... B65D 85/672
[52] U.S. Cl. .................................... 206/387; 206/309; 206/307; 312/319
[58] Field of Search ............... 206/387, 309, 444, 817, 206/307; 312/319, 345

[56] References Cited

U.S. PATENT DOCUMENTS

| | | | |
|---|---|---|---|
| 3,730,602 | 5/1973 | Campbell et al. | 206/309 |
| 3,899,229 | 8/1975 | Ackeret | 206/387 |
| 4,030,601 | 6/1977 | Ackeret | 206/387 |
| 4,087,145 | 5/1978 | Weavers | 206/387 |
| 4,138,703 | 2/1979 | Staut et al. | 206/309 |
| 4,162,112 | 7/1979 | Konkler | 206/387 |
| 4,191,292 | 3/1980 | Schweizer | 206/387 |
| 4,226,424 | 10/1980 | Gordon | 206/309 |
| 4,266,834 | 5/1981 | Ackeret | 206/387 |
| 4,275,943 | 6/1981 | Gelardi et al. | 206/387 |
| 4,399,913 | 8/1983 | Gelardi et al. | 206/387 |

Primary Examiner—Joseph Man-Fu Moy
Attorney, Agent, or Firm—Chilton, Alix & Van Kirk

[57] ABSTRACT

A container for storing recording media, especially compact discs has a housing and at least one transport member for holding the recording media, the transport member being displaceable relative to the housing under the influence of a spring assembly from a storage position into an ejected position in which the recording medium is rendered accessible and being locked in the storage position by a manually releasable locking arrangement against the force of the spring assembly. The container also has covers associated with each transport member for closing the associated housing opening in the storage position of the transport members, the covers being individually moved out of registration with their transport members in response to ejection thereof whereby it is possible to remove and insert a recording media in a straight line. Each transport member also has an energy storage mechanism coupled thereto for driving the transport member automatically into the storage position after a predetermined partial manual inward displacement.

29 Claims, 5 Drawing Sheets

Fig. 9

# CONTAINER FOR VIDEO AND SOUND RECORDING MEDIA

BACKGROUND OF THE INVENTION

1. Field of the Invention

The present invention relates to the storage of recording media and particularly to the manipulation of disc-shaped records incident to the efficient and safe removal from and return to storage of such records. More specifically, this invention is directed to improvements in storage systems for recording media, especially containers wherein disc-shaped records are supported on carriers which are relatively moveable to present the records for use. Accordingly, the general objects of the present invention are to provide novel and improved methods and apparatus of such character.

2. Description of the Prior Art

While not limited thereto in its utility, the present invention is particularly well suited for use in the manipulation, particularly the storage, of that form of optically read recording media known in the art as a "compact disc". Also, while again not limited thereto in its utility, the present invention is suitable for use in the environment of a motor vehicle where it is desirable that the user need pay but minimal attention to the functions of removing a disc from storage and returning a disc to storage.

Storage systems for recording media which are suitable for vehicle installation are known in the art. Such a storage system is, for example, shown in copending application Ser. No. 936,146. In the known storage systems, the record media are supported on carrier or transport members which are individually movable relative to a housing between an inserted or stored position, wherein the transport member and its contents are effectively within a protective housing, and an ejected position, where the transport member is positioned to present a record media carried thereby for retrieval from storage for use. A disadvantage of the prior art storage systems resides in the fact that, when a record media is to be returned to storage, a multi-step procedure must be followed. This relatively complicated procedure has the potential for distracting the user from other tasks and thus is undesirable. To be more specific, in order to afford protection to stored record media, it is customary practice for each of the transport members on which they are supported to be associated with a front wall or cover defining member. These front wall members cover the open side of the storage system housing when all of the transport members are in the inserted, i.e., record media storage, position. When a transport member is selected and moved to the ejected position, the front wall member associated therewith will desirably move upwardly or downwardly so that it will not interfere with the user grasping the record media and withdrawing it from the transport member. When it is desired to return a record media to storage on a transport member, the user must first insert the record media onto the transport member, then bring the cover member back into the closed position and finally insert the transport member into the housing. This relatively complicated series of movements is, for the reason noted above, undesirable.

It has been suggested that the above-discussed problem be rectified by providing a record media storage container in which the housing opening is only partly closed by cover members. This solution is depicted in published European Application No. 0,119,320, corresponding to U.S. Pat. No. 4,640,415, and is deemed aesthetically unsatisfactory.

SUMMARY OF THE INVENTION

The present invention overcomes the above-briefly discussed other deficiencies and disadvantages of the prior art by providing a novel and improved technique for the storage and retrieval of recording media. The present invention also encompasses a unique storage system for use in the practice of this novel method. In accordance with the present invention, record media may by returned to storage in a housing through the performance of only a single simple manipulative step. Apparatus in accordance with the present is characterized by the inability of the cover associated with a transport member to impede the insertion stroke as, for example, by collision with adjacent components of the storage system.

A storage system for plate-like recording media in accordance with the present invention has a housing with an access opening on one side thereof and at least a first transport member for supporting at least one record media. The transport member is displaceable relative to the housing, under the influence of a biasing spring assembly, from a storage position to an ejected position in which the record media is rendered accessible to the user. The system also includes a manually releasable locking arrangement for retaining the transport member in the housing against the force of the biasing spring assembly. A moveable cover is associated with each transport member for closing the portion of the housing opening associated with the transport member when the transport member is in the storage position. When the transport member moves to the ejected position under the influence of the biasing spring assembly, its associated cover will be moved into a position where it does not impede removal of a recording media from the transport member or insertion of a recording media onto the transport, such record media movement being generally parallel to the direction of transport member motion. An energy storage mechanism is provided for conveying the transport member automatically into the fully stored position after a predetermined partial inward displacement by the user. The extent of such partial inward movement is selected such that interference between the cover associated with the transport member and other components of the storage system is precluded. Accordingly, the cover may be arranged on the housing or on the transport member and will be brought to its final position either through the action of a biasing spring or by positive guides.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENTS

Figure 1:
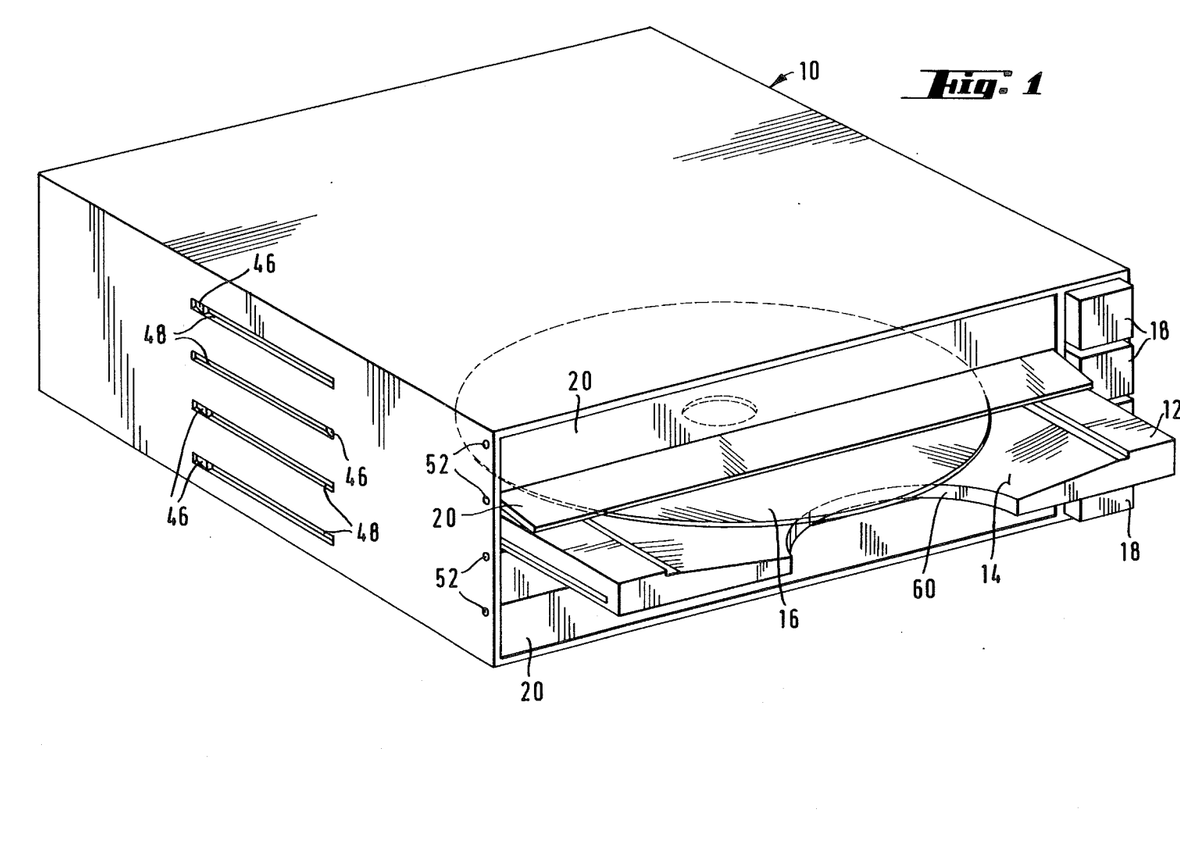
FIG. 1 is a perspective view of a storage system for compact discs in accordance with a first embodiment of the present invention.

With reference now to the drawing, FIG. 1 shows a storage system in accordance with a first embodiment of the invention having a capacity of four compact discs 16. Each of the discs 16, when not in use, is supported on a carrier or transport member 12. The transport members 12 are slidable supported in a housing, indicated generally at 10, which is open at the front side thereof so as to permit the transport members to move between an inserted or storage position, wherein the compact disc carried thereby is safely stored within the housing 10, and an ejected position where the compact disc may be easily grasped and removed for use. Each of the transport members 12 comprises a generally platter-shaped holder which is provided with a disc-receiving recess 14 in its upper surface. The recesses 14, when viewed in cross-section, are concave and thus a compact disc stored on a transport member is supported only in the edge region thereof which does not contain information.

In the embodiment of FIGS. 1-4, an actuator button 18 is arranged on the front of the housing 10 adjacent to each of the transport members 12. The actuator buttons permit the user to select a transport member for ejection. Thus, in the manner to be described below, application of inwardly directed force to the buttons 18 unlatches the transport members so that they may move to the ejected position under the influence of a biasing spring arrangement. A pivotally mounted door or cover 20 is provided for each of the transport members 12. The covers 20, in accordance with the present invention, automatically open when a transport member moves to the ejected position and automatically close when the transport member is returned to the inserted position.

Figure 2:
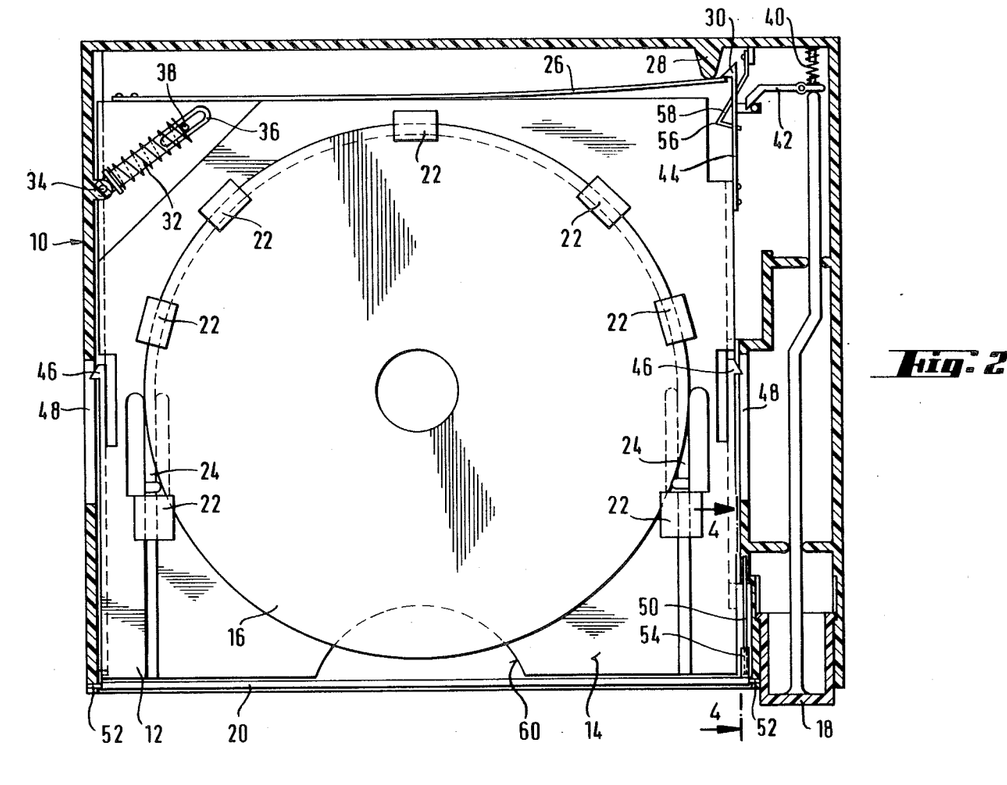
FIG. 2 is a cross-sectional top plan view of the storage system of FIG. 1, FIG. 2 being a view taken parallel to the principal plane of a stored disc and depicting a transport member in the inserted position.
Figure 3:
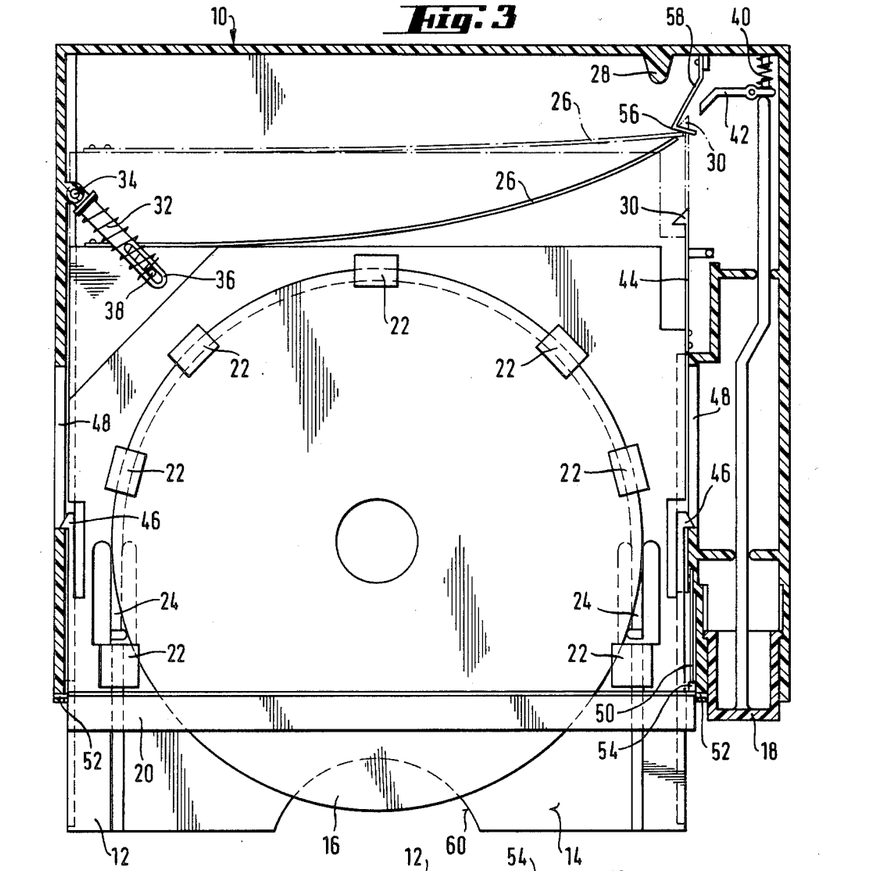
FIG. 3 is a view similar to FIG. 2 showing the transport member in the ejected position.
Figure 4:
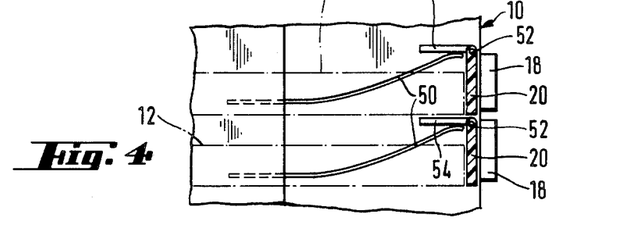
FIG. 4 is a partial cross-sectional view taken along line 4—4 of FIG. 2.

FIGS. 2 and 3 show, in section, the internal construction of the storage system of FIG. 1. Each of the transport members 12 has, formed integrally therewith, hold-down members 22 which engage over the edge of an inserted compact disc. Additionally, each of the transport members 12 is provided with a pair of spring arms 24 which yield laterally outwardly as a disc is inserted onto the transport member. The spring arms 24 are configured and positioned such that they frictionally engage a stored disc and exert an inwardly directed force on the disc when the maximum diameter thereof has passed the disc-contacting operating ends of arms 24. Accordingly, the spring arms insure that an inserted disc will be correctly positioned on the transport member even though the user may not have precisely aligned or fully inserted the disc when it was returned to storage. The spring arms 24 also insure that a disc will not be catapulted from a transport member as a result of the arresting of the movement thereof at the end of the ejection stroke of the transport member.

A leaf spring 26 is affixed, at the first end thereof, to the inner edge of each of the transport members 12. The free ends of the leaf springs 26 contact projections 28 formed on the rear wall of the housing 10. In the inserted positioned of the transport members, as depicted in FIG. 2, the leaf springs 26 are held in the biased, i.e., tensioned, state by catches 30 formed on resilient arms 44 which are part of the transport members. A helical coil spring 32 is also provided for each of the transport members 12. The springs 32 are mounted on slotted rods 36. The rods 36 are pivotally mounted, at first ends thereof, to the housing 10. This pivotal mounting is accomplished through the use of pivot pins 34. The springs 32 are in compression between the pivot pins and counter-supports 38 mounted on the transport members 12. The counter-supports 38 extend through the slots in rods 36. The inserted or storage position of the transport members 12 is determined by stops.

The actuator buttons 18 are biased outwardly by means of springs 40. Depression of an actuator button 18 toward the rear of the housing 10, i.e., against the bias of spring 40, will cause a control lever 42 to be pivoted. The pivotal motion of control lever 42 will result in outward, i.e., toward the side of housing 10, deflection of the resilient arm 44 and thus a retracting movement of the catch 30. Retraction of catch 30 will cause the release of the free end of leaf spring 26. The leaf spring 26 is sufficiently strong so that, when it is released from catch 30, it exerts adequate force on the transport member 12 to overcome the oppositely directed component of force resulting from the action of spring 32. Accordingly, the transport member 12 will be pushed, in the ejection direction, out of the front of the housing 10. The force provided by spring 32 will initially increase in opposition to the ejection stroke and, when the support 38 has moved past alignment with the pivot pin 34, the direction of action of the spring 32 will be reversed and it will aid the ejection motion. Due to the action of spring 32, the free end of leaf spring 26 will move forwardly past a resilient catch 56, catch 56 being formed on the end of a spring arm 58. Spring arm 58 is a "soft" spring and thus permits catch 56 to deflect outwardly allowing spring 26 to pass. The fully ejected position of a transport member is defined by stop members 46 which are provided on the transport member, the stop members 46 running in slots 48 provided in the side of the housing 10. This fully ejected position is shown in FIG. 3.

The cover 20 associated with a transport member 12 is pushed open during outward movement of the transport member. The covers 20 are pivotally mounted, as indicated at 52, in the housing and are biased to the closed position by springs 50. As may be seen from FIG. 4, the springs 50 act on lever arms 54 which are formed integrally with the covers 20.

Referring to FIG. 3, as noted above, during the ejection stroke of a transport member the free end of the leaf spring 26 will move past catch 56 formed on resilient arm 58 which is supported from the rear wall of the housing 10. Upon manual reinsertion of the transport member into the housing 10, the helical coil spring 32 will initially be compressed, and thus energy will be stored therein, and the free end of spring 26 will engage catch 56 which acts as a deflectable stop. As the transport member is pushed further into the housing, when the counter-support 38 moves past the pivot pin 34, the spring 32 will take over the insertion of the transport member and the stored energy will move the transport member to its fully inserted position as shown in FIG. 2. During the insertion movement, because of the different engagement angle between catch 56 and spring 26 when compared to the ejection action, the free end of spring 26 will initially be cought on catch 56 and thus will be overtaken by catch 30. Upon continued exertion of manual force in the insertion direction, catch 56 will never-the-less be wedgingly deflected. However, because of the cooperation between spring 26 and catch 30, spring 26 will not develope a force in opposition to spring 32 and thus spring 32 can return the transport member to the fully inserted position.

Continuing to refer to FIG. 3, the transport members 12 are provided with arcuate cut-outs 60 in the forwardly facing edges thereof. These cut-outs 60 permit, in the ejected position of the transport member, a disc supported on the transport to be easily grasped in the edge region thereof and removed from the transport member for use in a playback system. The withdrawal and return of a disc to a transport member may be straight line motion in a direction parallel to the direction of motion of the transport member.

Figure 5:
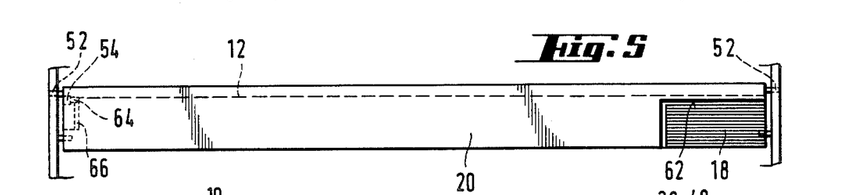
FIG. 5 is a partial front view of a storage system in accordance with a second embodiment of the invention.
Figures 6, 7:
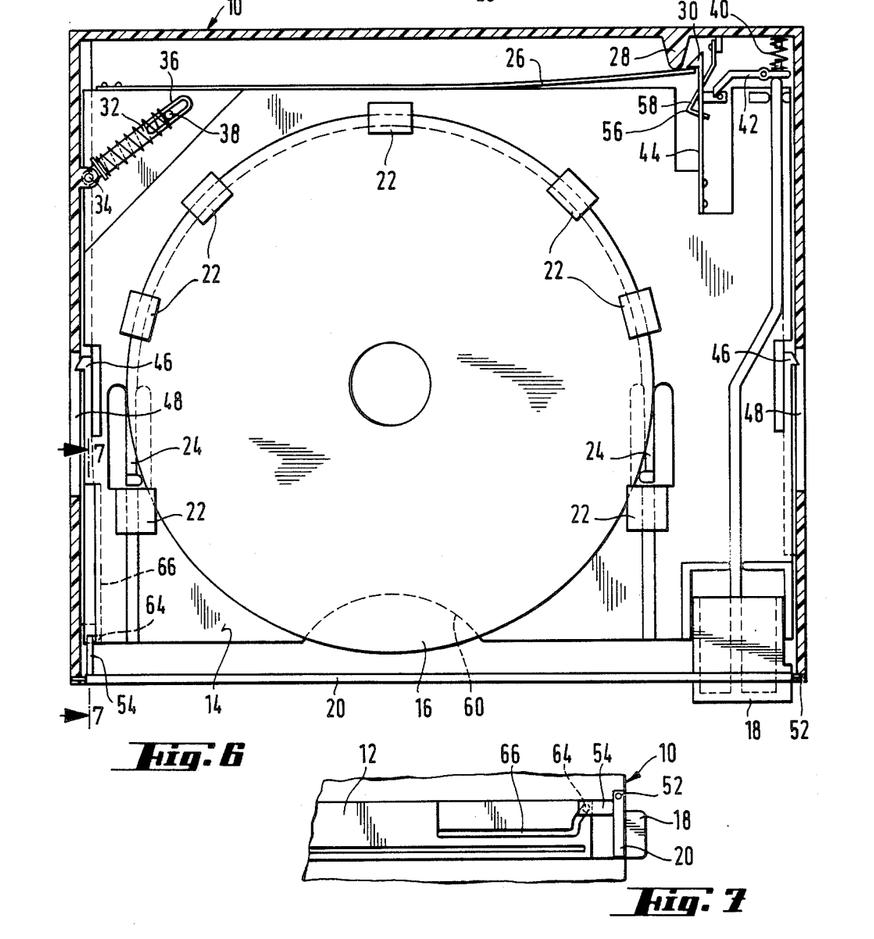
FIG. 6 is a view similar to FIG. 2, but with several elements which are the same as employed in the FIG. 2 embodiment omitted, of the embodiment of FIG. 5.
FIG. 7 is a partial cross-sectional view taken along the line 7—7 of FIG. 6.

Referring now to FIGS. 5-7, the ejection and insertion mechanism of the depicted second embodiment of the invention is substantially the same as that described above in the discussion of the embodiment of FIGS. 1-4. However, in the embodiment of FIGS. 5-7 the actuator buttons 18 are arranged on the transport members 12. Thus, as may be seen from FIG. 5, the actuator buttons 18 are received in cut-outs 62 in the hinged covers 20. As in the embodiment of FIGS. 1-4, the covers 20 are mounted on the housing so as to pivot about pins 52. As may be seen from FIGS. 6 and 7, the lever arm 54 on each cover 20 engages a control cam member 64 located in a guide-ways 66 formed on the transport member 12. The guide-way 66 are shaped as shown in FIG. 7 and thus the covers 20 are constrained to open as a result of the outward movement of the transport member and are likewise constrained to close upon insertion of the transport member into the housing.

Figures 8, 9:
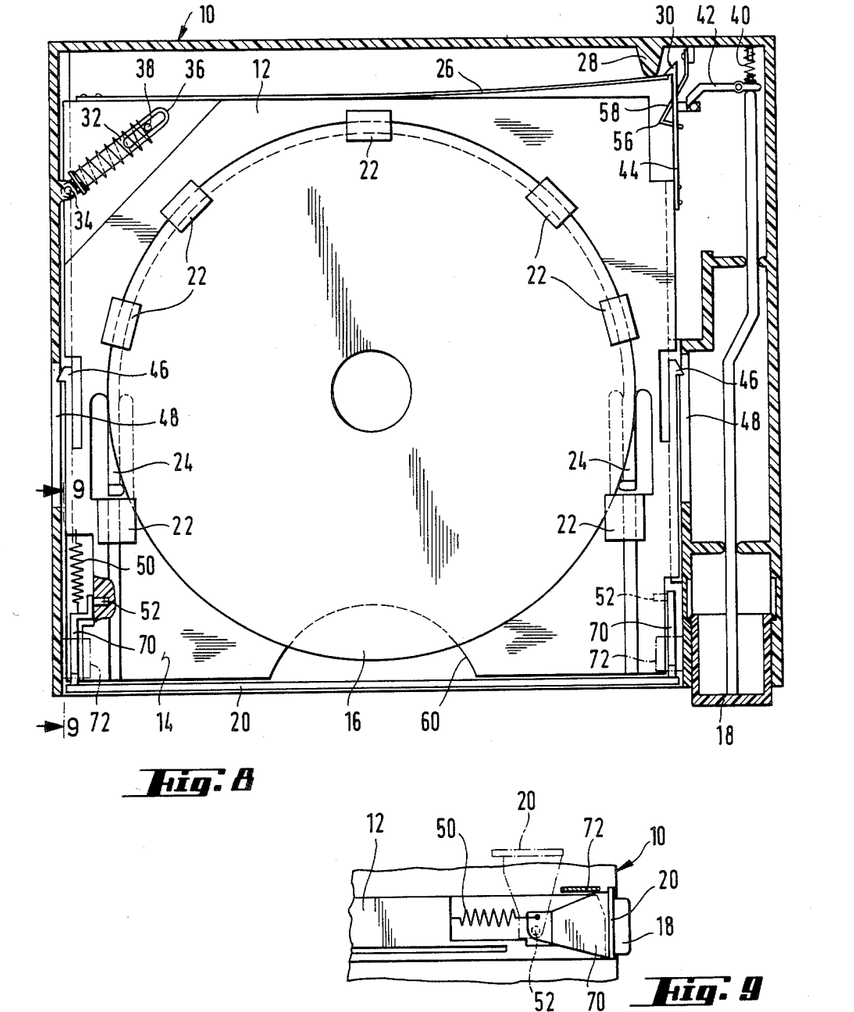
FIG. 8 is view, similar to that of FIG. 2, of a third embodiment of the invention, elements which are common to the embodiments of FIGS. 2 and 8 being omitted from FIG. 8.
FIG. 9 is a partial view depicting the cover member associated with the transport shown in FIG. 8.

The ejection and insertion mechanism of the embodiment of FIGS. 1-4 may also be provided in the embodiment of FIGS. 8 and 9. In the embodiment of FIGS. 8 and 9 the hinged covers 20 are mounted on the transport members 12, rather than on the housing, and pivot about pivot pins 52 which lie adjacent the free ends of inwardly directed extensions 70 of covers 20. A tension spring 50 biases each hinged cover 20 into the open position as shown by the broken line showing in FIG. 9. Upon insertion of the transport member into the housing, its cover 20 will be guided back into the closed position as a result of the extensions 70 running onto ribs 72 which are formed on the inside of housing 10.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a storage system for plate-like recording media, the system having a housing with an access opening in one side thereof and at least a first transport member for supporting at least one recording media, the transport member being displaceable relative to the housing under the influence of a biasing spring assembly from a storage position to an ejected position in which the recording media is rendered accessible, the system also including a manually releasable locking arrangement for retaining the transport member in the housing against the force of the biasing spring assembly, the system further having a moveable cover associated with each transport member for closing the portion of the housing access opening associated with the transport member when the transport member is in the storage position and the cover is in a first position, the cover being moved into a second position in which it is possible to remove a recording media from and return a recording media to an ejected transport member in a direction which is generally parallel to the direction of transport member motion, the improvement comprising:

energy storage means associated with each transport member, said energy storage means producing a force which causes the transport member to automatically move into the storage position after manually produced partial displacement from the ejected position toward the storage position.

2. The apparatus of claim 1 wherein energy is stored in said energy storage means by said predetermined partial manual displacement.

3. The apparatus of claim 1 wherein said energy storage means comprises spring means.

4. The apparatus of claim 2 wherein said energy storage means comprises spring means.

5. The apparatus of claim 3 wherein said spring means includes a spring and over-center mounting means for said spring, said mounting means being connected to said housing and transport member whereby energy is stored in said spring means during said partial displacement and said mounting means reverses the direction of the force provided by said spring whereby stored energy is returned to said transport member after said partial displacement.

6. The apparatus of claim 4 wherein said spring means includes a spring and over-center mounting means for said spring, said mounting means being connected to said housing and transport member whereby energy is stored in said spring means during said partial displacement and said mounting means reverses the direction of the force provided by said spring whereby stored energy is returned to said transport member after said partial displacement.

7. The apparatus of claim 1 wherein each cover associated with a transport member is mounted on the housing.

8. The apparatus of claim 1 wherein each cover associated with a transport member is mounted on the transport member.

9. The apparatus of claim 7 wherein each said cover member has said second open position and said first closed position and is resiliently biased to one of said positions.

10. The apparatus of claim 8 wherein each said cover member has said second open position and said first closed position and is resiliently biased to one of said positions.

11. The apparatus of claim 7 wherein said system comprises a plurality of transport members, a cover being associated with each of said transport members, the covers being resiliently biased into the first closed position wherein they are oriented generally transversely with respect to the direction of motion of the transport member, said covers being moveable into the second open position in response to movement their associated transport member from the storage to the ejected position.

12. The apparatus of claim 7 wherein said system comprises a plurality of transport members, a cover being associated with each transport member, said covers being moveable between the first closed position and the second open position, said covers being constrained to move between said positions in response to movement of the associated transport member.

13. The apparatus of claim 8 wherein said system comprises a plurality of transport members, a cover being associated with each transport member, said covers being moveable between the first closed position and the second open position, said covers being constrained to move between said positions in response to movement of the associated transport member.

14. The apparatus of claim 5 wherein each cover is pivotally mounted on the housing.

15. The apparatus of claim 8 wherein each cover is pivotally mounted on its associated transport member.

16. The apparatus of claim 7 wherein said manually releasable locking arrangement is provided for each transport member and includes an actuator button extending outwardly with respect to the said one side of the housing.

17. The apparatus of claim 8 wherein a manually releasable locking arrangement is provided for each transport member and includes an actuator button extending outwardly with respect to the said one side of the housing.

18. The apparatus of claim 16 wherein each said actuator button is mounted on the housing.

19. The apparatus of claim 17 wherein each said actuator button is mounted on the housing.

20. The apparatus of claim 1 wherein each transport member is slidably mounted in the housing and defines a plane of support for the record media.

21. The apparatus of claim 20 wherein each transport member is provided with a recess in a surface thereof for accommodating the record media.

22. The apparatus of claim 20 wherein each transport member includes a cut-out in the edge thereof which faces outwardly, said cut-out extending sufficiently inwardly to permit grasping from two opposite sides thereof a record media supported on the transport member.

23. The apparatus of claim 20 wherein each transport member is provided with plural members for frictionally engaging a record media supported thereon.

24. The apparatus of claim 23 wherein said frictional engagement members comprise oppositely acting resilient arms which engage the edges of the record media.

25. The apparatus of claim 7 wherein said storage system includes a plurality of transport members, a cover being associated with each of said transport members, said covers each being resiliently biased into the first closed position wherein the cover is oriented substantially transverse to the direction of movement of its associated transport member, and wherein the transport members are provided with side members which move the associated cover into the second open position in response to movement of the transport member in the ejection direction.

26. The apparatus of claim 9 wherein said storage system includes a plurality of transport members, a cover being associated with each of said transport members, said covers each being resiliently biased into the first closed position wherein the cover is oriented substantially transverse to the direction of movement of its associated transport member, and wherein the transport members are provided with side members which move the associated cover into the second open position in response to movement of the transport member in the ejection direction.

27. The apparatus of claim 10 wherein said storage system includes a plurality of transport members, a cover being associated with each of said transport members, said covers each being resiliently biased into a closed position wherein the cover is oriented substantially transverse to the direction of movement of its associated transport member, and wherein said transport member is provided with side members which move the associated cover into an open position in response to movement of the transport member in the ejection direction.

28. The apparatus of claim 20 wherein said storage system includes a plurality of transport members, a cover being associated with each of said transport members, said covers each being resiliently biased into a closed position wherein the cover is oriented substantially transverse to the direction of movement of its associated transport member, and wherein said transport member is provided with side members which move the associated cover into an open position in response to movement of the transport member in the ejection direction.

29. The apparatus of claim 20 wherein the transport member has a front region accessible for record media insertion.

* * * * *

UNITED STATES PATENT AND TRADEMARK OFFICE
CERTIFICATE OF CORRECTION

PATENT NO. : 4,747,484
DATED : May 31, 1988
INVENTOR(S) : Peter Ackeret

It is certified that error appears in the above-identified patent and that said Letters Patent is hereby corrected as shown below:

```
In claim 1, line 17, after "position", insert -- upon
displacement of said transport member into said ejected
position --.
```

Signed and Sealed this

Twenty-seventh Day of December, 1988

Attest:

DONALD J. QUIGG

*Attesting Officer*  *Commissioner of Patents and Trademarks*